(12) United States Patent
Tanaka et al.

(10) Patent No.: US 10,134,538 B2
(45) Date of Patent: Nov. 20, 2018

(54) ELECTRONIC DEVICE

(71) Applicant: Sony Interactive Entertainment Inc., Tokyo (JP)

(72) Inventors: Tetsuya Tanaka, Tokyo (JP); Mito Satoshi, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/661,208

(22) Filed: Jul. 27, 2017

(65) Prior Publication Data

US 2018/0040437 A1    Feb. 8, 2018

(30) Foreign Application Priority Data

Aug. 2, 2016    (JP) ................. 2016-152224

(51) Int. Cl.
| | | |
|---|---|---|
| *H01H 13/02* | (2006.01) | |
| *F21V 8/00* | (2006.01) | |
| *H01H 13/14* | (2006.01) | |

(52) U.S. Cl.
CPC ......... *H01H 13/023* (2013.01); *G02B 6/0055* (2013.01); *G02B 6/0081* (2013.01); *H01H 13/14* (2013.01); *H01H 2219/062* (2013.01); *H05K 999/99* (2013.01)

(58) Field of Classification Search
USPC ........................................................ 362/23
See application file for complete search history.

(56) References Cited

U.S. PATENT DOCUMENTS

2011/0228551 A1*  9/2011  Verschuren .......... G02B 6/0035
362/555

FOREIGN PATENT DOCUMENTS

| JP | 56046921 U | 4/1981 |
|---|---|---|
| JP | 63122384 U | 8/1988 |
| JP | 2002216567 A | 8/2002 |
| JP | 2010244768 A | 10/2010 |
| JP | 2013222774 A | 10/2013 |

OTHER PUBLICATIONS

Notification of Reasons for Refusal for corresponding JP Application No. 2016152224, 14 pages, dated May 22, 2018.

* cited by examiner

*Primary Examiner* — Matthew Mikels
(74) *Attorney, Agent, or Firm* — Matthew B. Dernier, Esq.

(57) ABSTRACT

An electronic device includes a manipulating member extending in first directions and having a portion serving as a pressable portion which is pressed by a user, the manipulating member being elastically deformable such that the pressable portion is movable in second directions transverse to the first directions; a light source; and a light guide member configured to receive light from the light source, the light guide member extending in the first directions and being disposed along the manipulating member, the light guide member being separate from the manipulating member. The manipulating member is made of a light-transmissive material and is caused to glow by the light received from the light guide member.

5 Claims, 8 Drawing Sheets

ELECTRONIC DEVICE

BACKGROUND

The present disclosure relates to the structure of buttons on an electronic device.

Japanese Patent Laid-Open No. 2013-222774 (hereinafter referred to as Patent Document 1) discloses an electronic device having on its front face a bar-shaped manipulating member that extends in leftward and rightward directions. The manipulating member is referred to as "manipulating bar" in Patent Document 1. The electronic device includes a switch disposed behind an end of the manipulating member, for turning on and off a power supply in the electronic device. The end of the manipulating member functions as a button. The user of the electronic device can turn on and off the power supply in the electronic device by pressing the end of the manipulating member. When the end of the manipulating member is released of the push, the end of the manipulating member returns to its initial position under the resilient force of the manipulating member.

According to Patent Document 1, a light source, specifically a light emitting diode (LED), is disposed adjacent to the switch. The manipulating member has a light guide on its end, so that the end of the manipulating member emits light transmitted from the light source through the light guide. The light guide is integrally formed with the manipulating member.

SUMMARY

According to Patent Document 1, only the end of the manipulating member emits light. If a wide zone of the manipulating member is to emit light in a manner different from Patent Document 1, then it is necessary for the manipulating member to incorporate a light guide that is long in the leftward and rightward directions. However, since the light guide is integrally formed with the manipulating member according to Patent Document 1, the shape of the light guide affects the resilient force of the manipulating member, i.e., reaction forces generated by the manipulating member when the end of the manipulating member is pressed. If the shape of the light guide is optimized in order to emit light from a desired wide zone of the manipulating member, then the manipulating member may possibly be unable to produce a preferable resilient force.

It is desirable to provide an electronic device which includes a light guide member and a manipulating member that are structurally optimized to cause the manipulating member to emit light from a wide zone thereof and also to cause the manipulating member to produce suitable reaction forces when the manipulating member is pressed.

According to an embodiment of the present disclosure, there is provided an electronic device including a manipulating member extending in first directions and having a portion serving as a pressable portion which is pressed by a user, the manipulating member being elastically deformable such that the pressable portion is movable in second directions transverse to the first directions; a light source; and a light guide member configured to receive light from the light source, the light guide member extending in the first directions and being disposed along the manipulating member, the light guide member being separate from the manipulating member. The manipulating member is made of a light-transmissive material and is caused to glow by the light received from the light guide member. The light guide member and the manipulating member of the above electronic device can be structurally optimized to cause the manipulating member to glow over a wide zone thereof and also to produce appropriate reaction forces when the pressable portion of the manipulating member is pressed.

DETAILED DESCRIPTION OF THE PREFERRED EMBODIMENT

Figure 1:
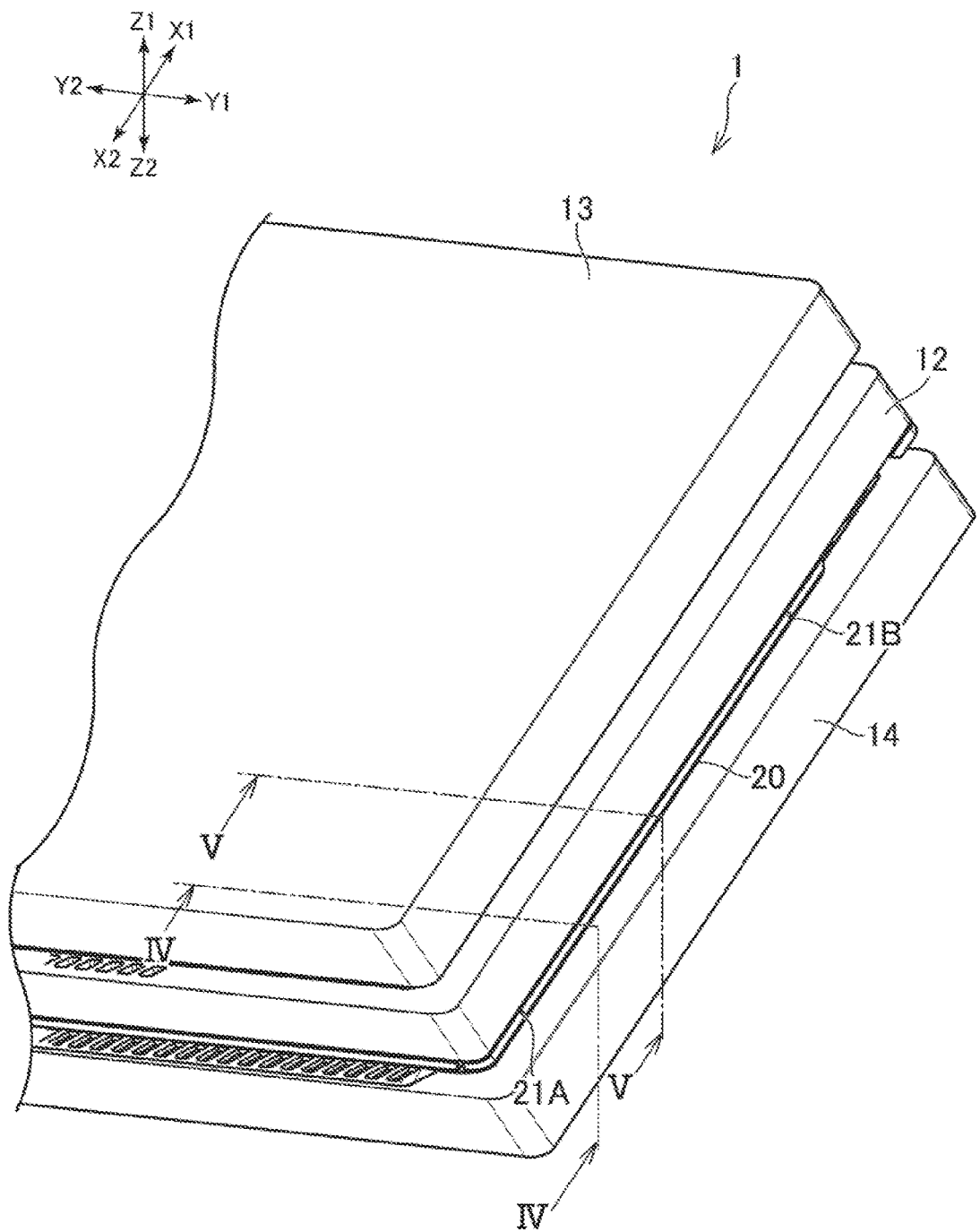
FIG. 1 is a fragmentary perspective view of an electronic device according to an embodiment of the present disclosure.
Figure 2A:
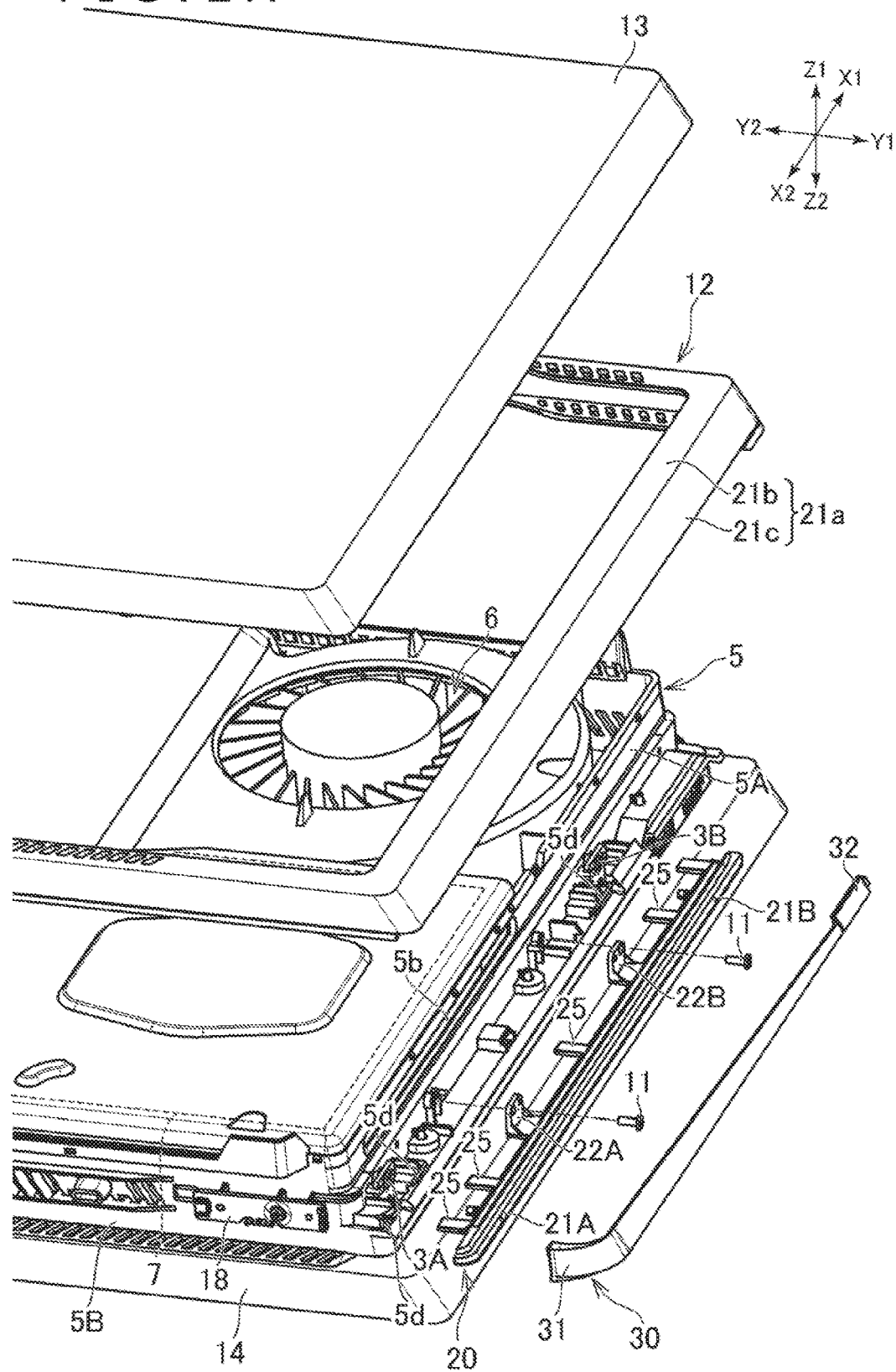
FIG. 2A is an exploded perspective view of the electronic device shown in FIG. 1.
Figure 2B:
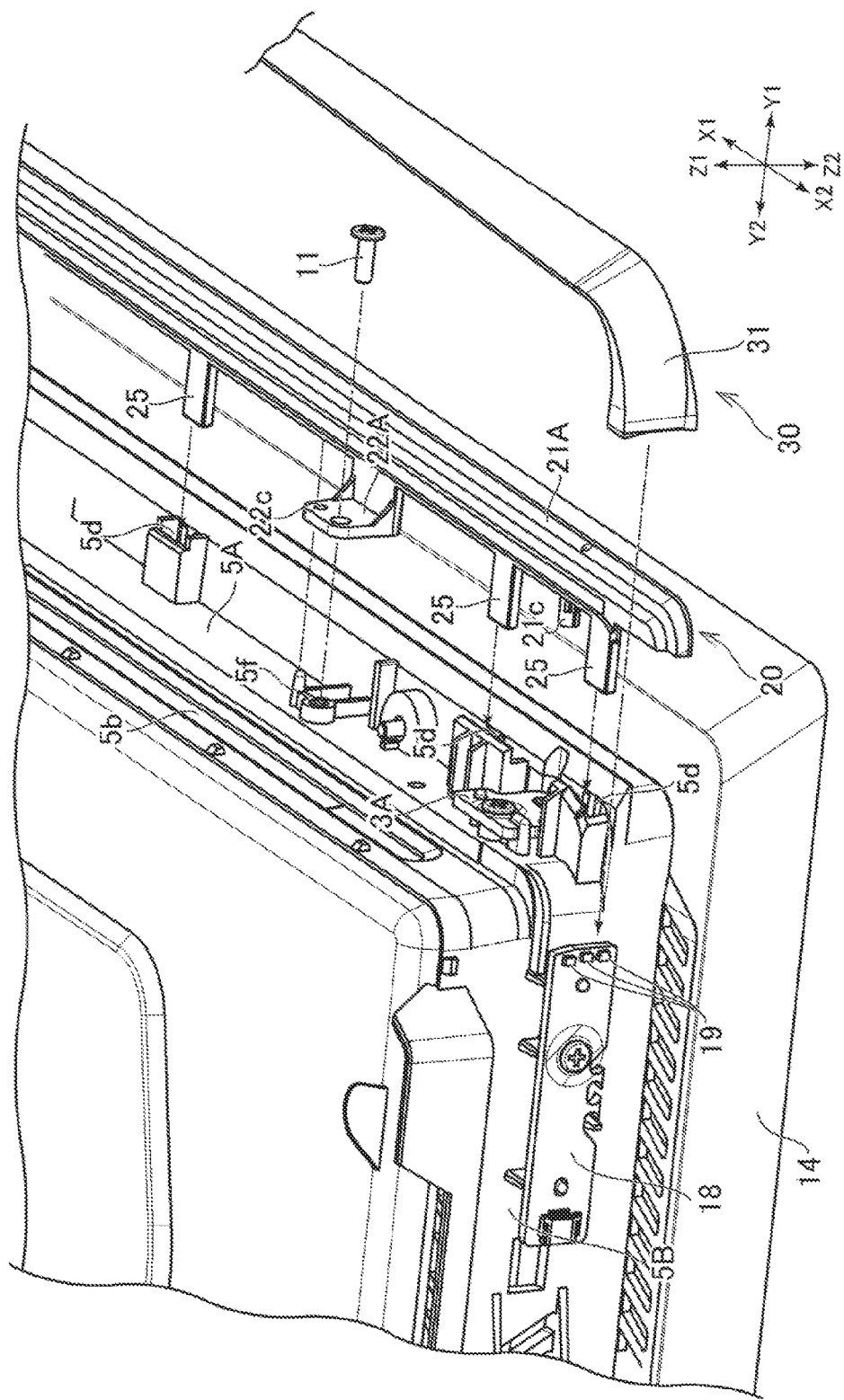
FIG. 2B is an enlarged view of the electronic device shown in FIG. 2A, showing a portion thereof where light sources are disposed.
Figure 3:
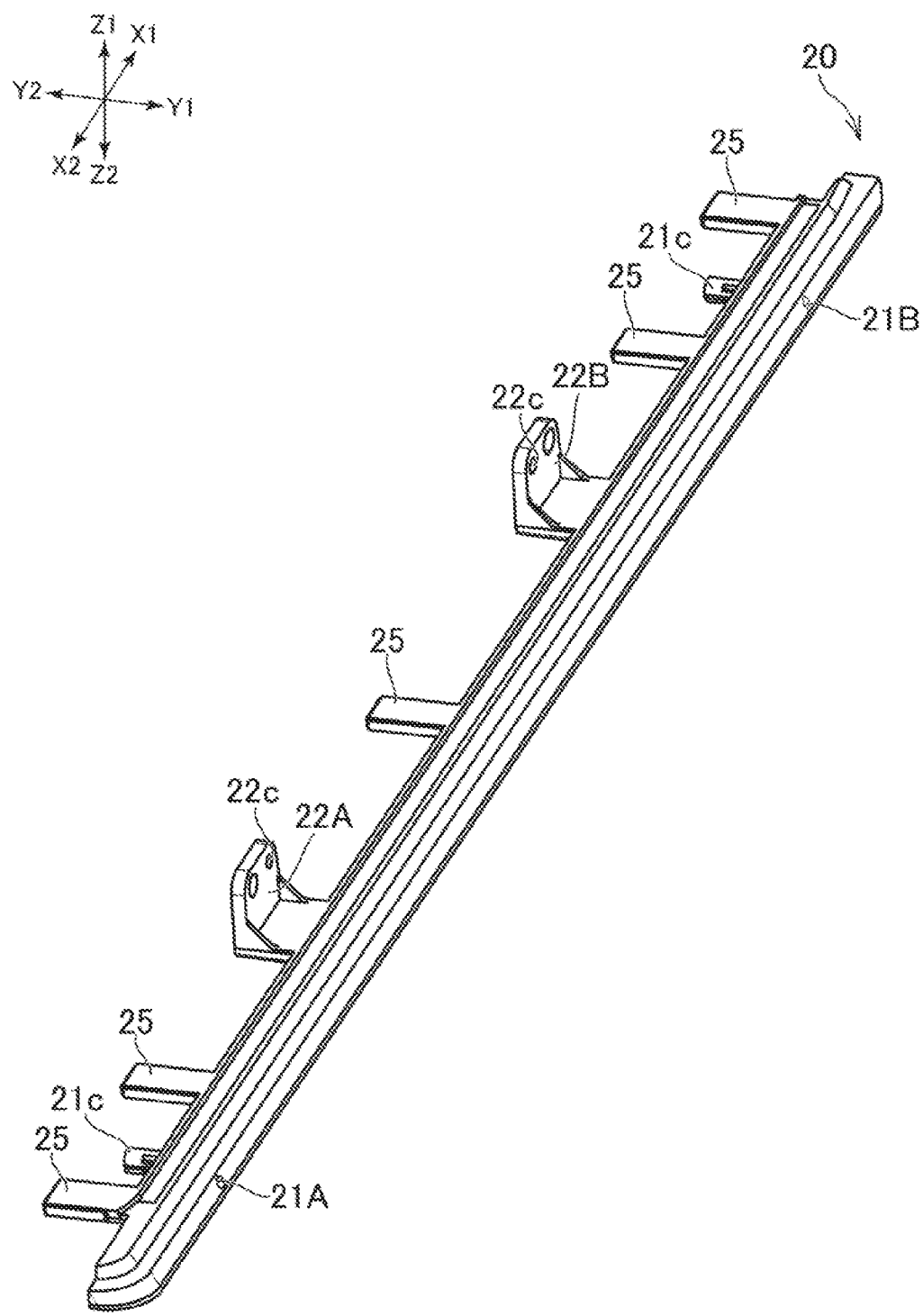
FIG. 3 is a perspective view of a manipulating bar.
Figure 4A:
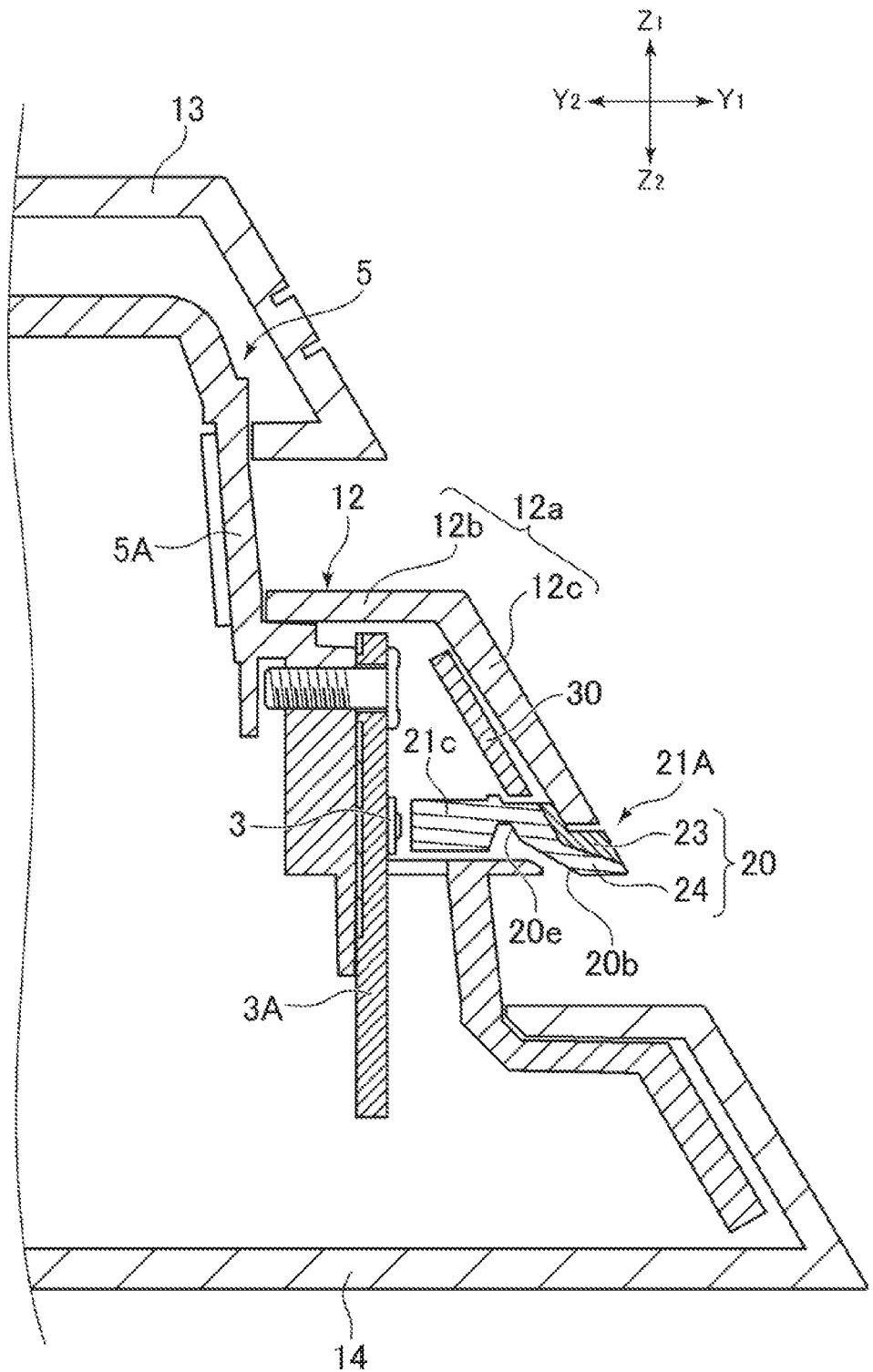
FIG. 4A is a cross-sectional view of the electronic device taken along line IV-IV of FIG. 1.
Figure 4B:
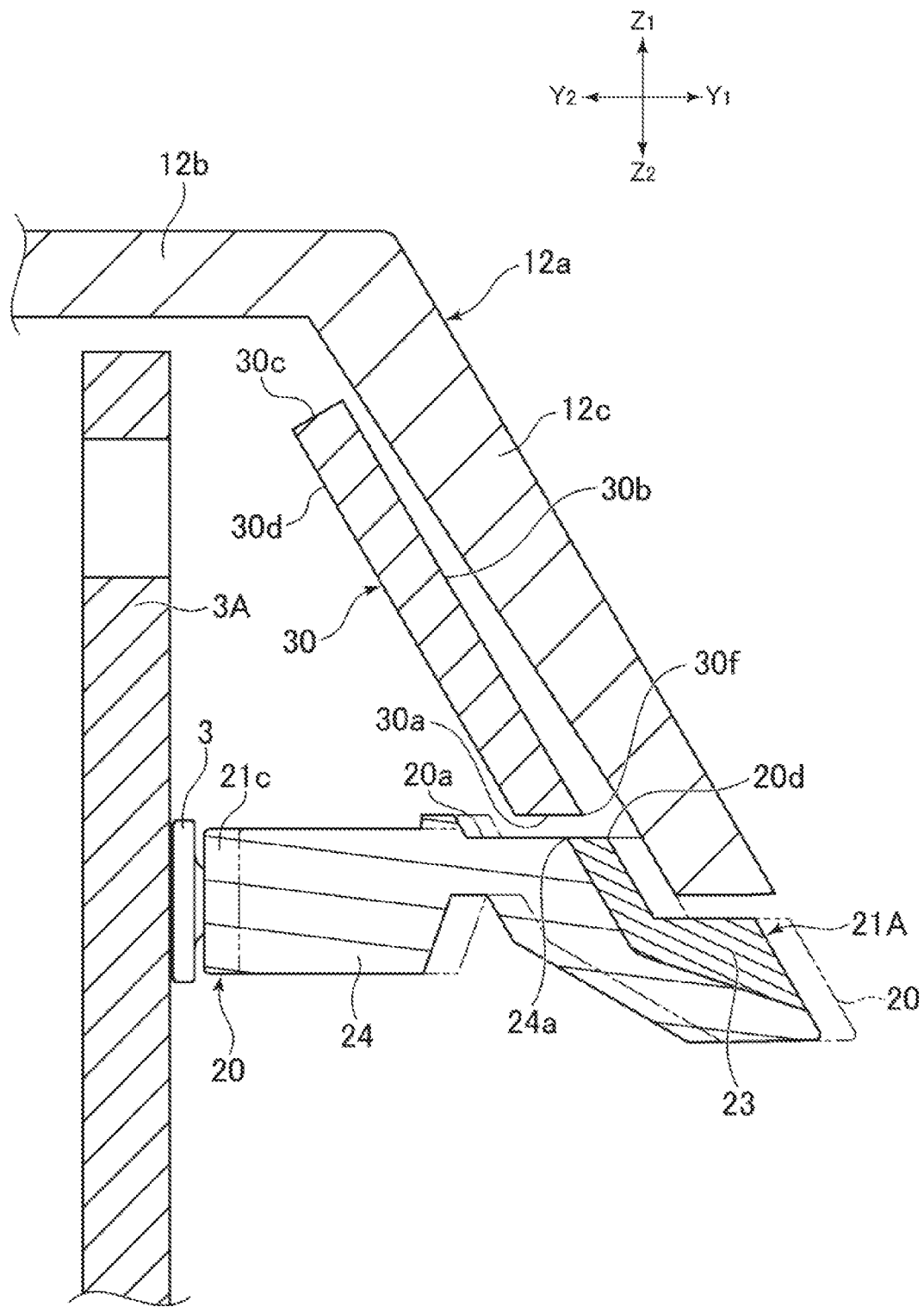
FIG. 4B is an enlarged view of the electronic device shown in FIG. 4A.
Figure 5A:
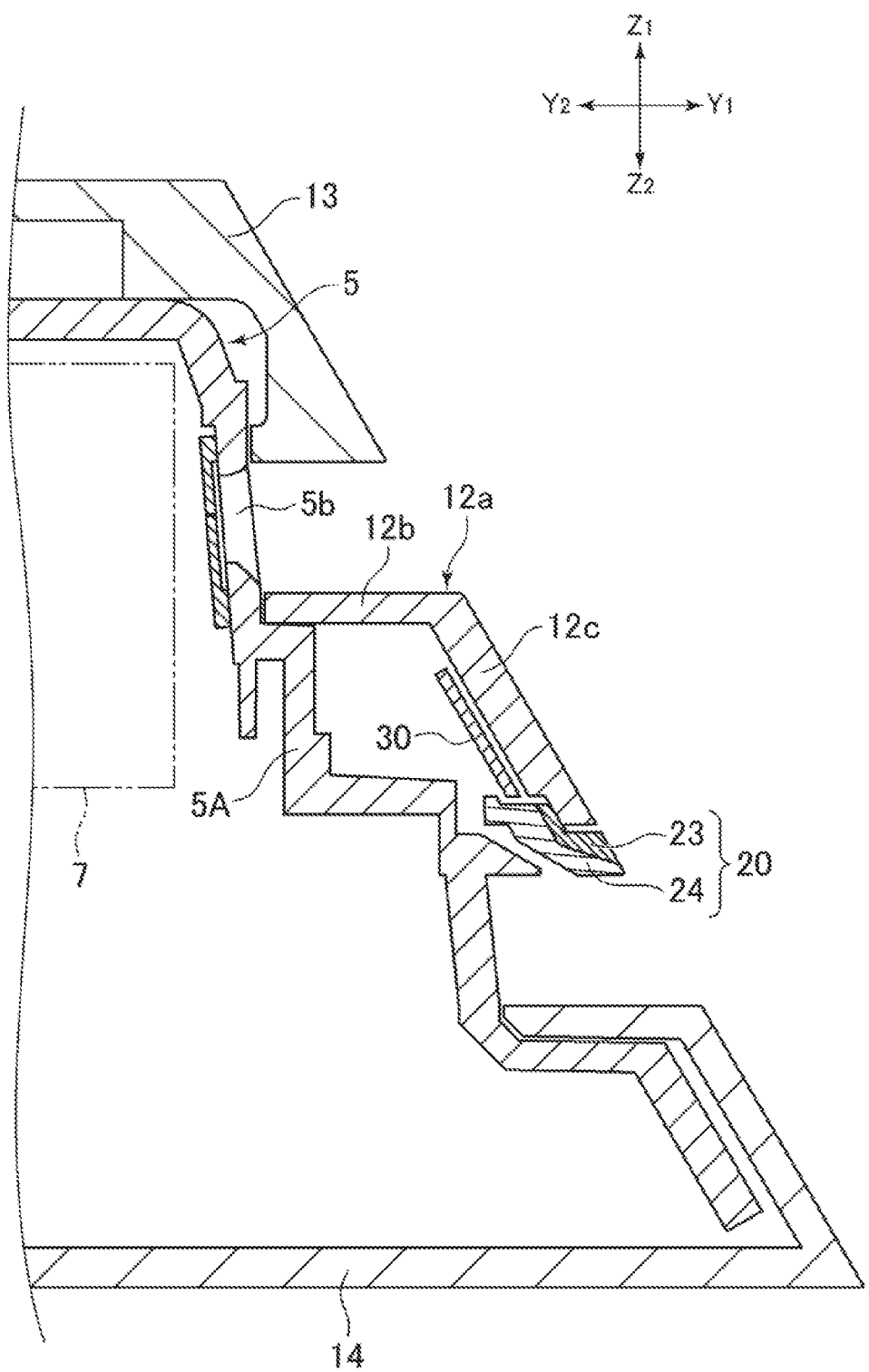
FIG. 5A is a cross-sectional view of the electronic device taken along line V-V of FIG. 1.
Figure 5B:
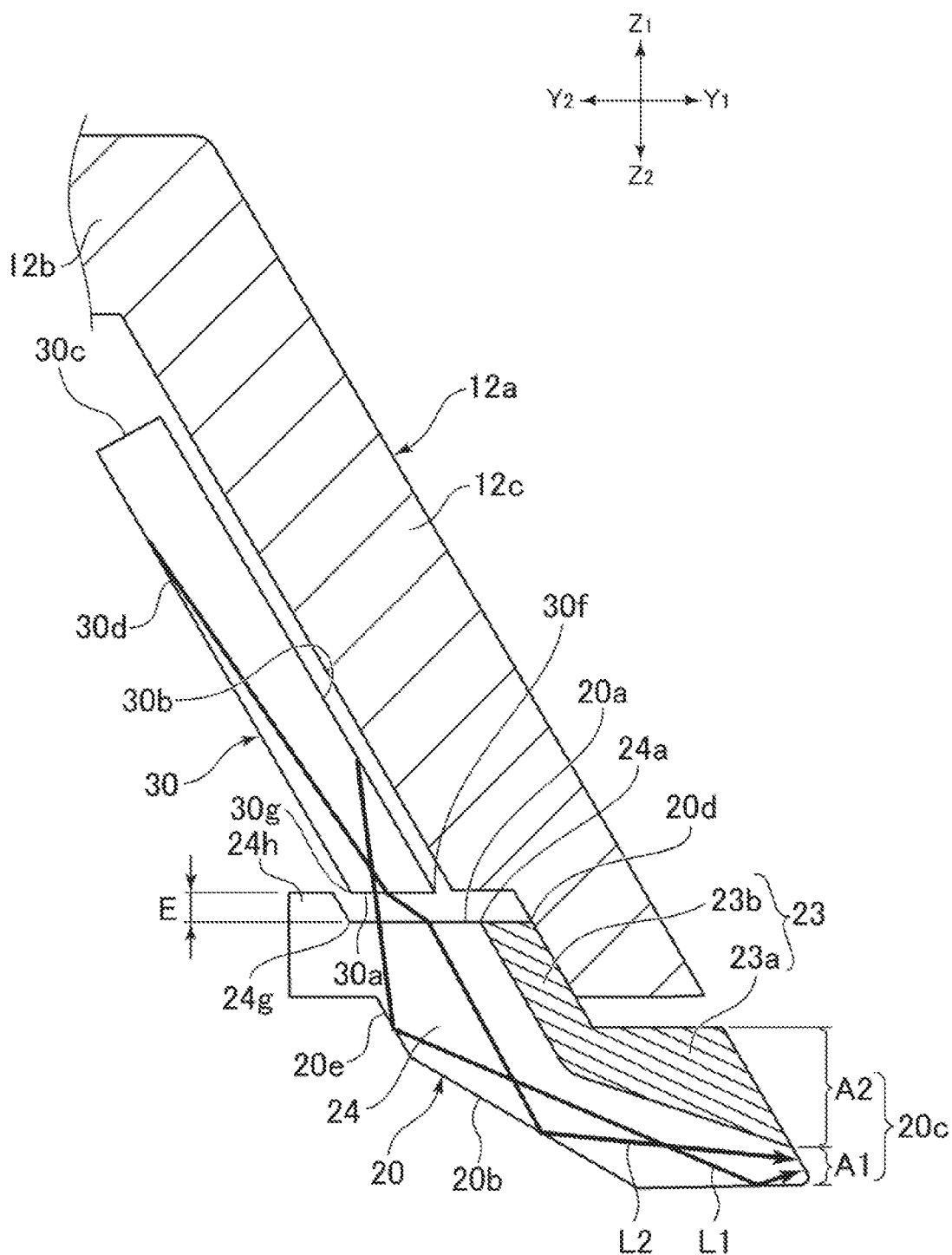
FIG. 5B is an enlarged view of the electronic device shown in FIG. 5A.

An embodiment of the present disclosure will be described below. FIG. 1 shows in fragmentary perspective an electronic device 1 according to the embodiment of the present disclosure. FIG. 2A shows in exploded perspective the electronic device 1 shown in FIG. 1. FIG. 2B is an enlarged view of the electronic device 1 shown in FIG. 2A, showing a portion thereof where light sources 19 are disposed. FIG. 3 shows a manipulating bar 20 in perspective. FIG. 4A shows in cross section the electronic device 1 taken along line IV-IV of FIG. 1. FIG. 4B shows at an enlarged scale the electronic device 1 shown in FIG. 4A. In FIG. 4B, a pressable portion 21A is indicated by the solid lines when it is pressing a switch 3, and by the two-dot-and-dash lines when it is in an initial position. FIG. 5A shows in cross section the electronic device 1 taken along line V-V of FIG. 1. FIG. 5B shows at an enlarged scale the electronic device 1 shown in FIG. 5A. In the description that follows, the directions indicated by the arrows X1 and X2 in FIG. 1 will be referred to as rightward and leftward directions, respectively, the directions indicated by the arrows Y1 and Y2 as forward and rearward directions, respectively, and the directions indicated by the arrows Z1 and Z2 as vertical or upward and downward directions, respectively.

The electronic device 1 includes an entertainment device functioning as a game device or an audio-visual device, for example. The electronic device 1 outputs moving-image data generated by executing game programs, video and audio data acquired from recording mediums such as optical discs, and/or video and audio data acquired via networks, to a display device such as a television set. The electronic device 1 is not limited to an entertainment device such as a game device or the like, but may be a personal computer.

As shown in FIGS. 1 and 3, the electronic device 1 has on its front face a manipulating bar 20 that extends in leftward and rightward directions. The manipulating bar 20 includes portions defined as pressable portions 21A and 21B for being pressed by the user of the electronic device 1. In the illustrated electronic device 1, specifically, the manipulating bar 20 includes a plurality of (more specifically, two)

pressable portions 21A and 21B spaced from each other in the leftward and rightward directions. Switches 3 (see FIG. 4A) for causing the electronic device 1 to perform predetermined operations are disposed individually behind or rearwardly of the pressable portions 21A and 21B. Stated otherwise, the pressable portions 21A and 21B are portions of the manipulating bar 20 that are positioned in front of or forwardly of the switches 3. As shown in FIGS. 2A and 2B, the electronic device 1 includes circuit boards 3A and 3B disposed rearwardly of the manipulating bar 20. The switches 3 are mounted individually on the circuit boards 3A and 3B.

The switches 3 include, for example, switches for turning on and off the electronic device 1. As shown in FIG. 2A, the electronic device 1 has an optical disc drive 7 for reading data stored on an optical disc inserted therein. The switches 3 may instead be switches for ejecting the optical disc from the optical disc drive 7. As shown in FIG. 3, the front surfaces of the pressable portions 21A and 21B may be provided with marks representing the function of the switches 3. The function of the switches 3 is not limited to those described above with respect to the illustrated electronic device 1, but may be modified. The number of pressable portions 21A and 21B, i.e., the number of the switches 3, is not limited to two, but may be one or three or more.

The manipulating bar 20 is made of a light-transmissive material. For example, the manipulating bar 20 is made of a synthetic resin such as acrylic resin that transmits light therethrough. In the illustrated electronic device 1, as shown in FIG. 5A, the manipulating bar 20 has a light-transmissive member 24 made of a light-transmissive material and extending in the leftward and rightward directions, and a light-blocking member 23 made of a light-blocking material and disposed along the light-transmissive member 24. The light-transmissive member 24 is made of a synthetic resin such as acrylic resin. The light-blocking member 23 is made of a synthetic resin colored black, for example. The light-transmissive member 24 of the manipulating bar 20 may contain a light diffusing agent in the form of fine particles for diffusing light transmitted from a light guide bar 30. The manipulating bar 20 is caused to glow by the light transmitted from the light guide bar 30, as described later. The manipulating bar 20 which includes the light-transmissive member 24 and the light-blocking member 23 is formed by a two-color molding process, for example. According to a modification, the manipulating bar 20 may not include the light-blocking member 23.

As shown in FIG. 2A, the electronic device 1 has a main body frame 5. On the main body frame 5, there are mounted various components of the electronic device 1, including the optical disk drive 7, a circuit board, not shown, with a microprocessor installed thereon, and a cooling fan 6 for cooling the microprocessor. The electronic device 1 also has an upper cover 13 covering the upper side of the main body frame 5 and a lower cover 14 covering the lower side of the main body frame 5. The main body frame 5 includes a front wall 5A disposed forwardly of the optical disc drive 7. The front wall 5A has an insertion slot 5b (see FIG. 5A) defined therein through which an optical disc can be inserted into the optical disc drive 7.

As shown in FIGS. 2A and 3, the manipulating bar 20 has fixtures 22A and 22B positionally fixed on portions thereof. In the illustrated electronic device 1, the fixtures 22A and 22B are mounted on the front wall 5A of the main body frame 5. Specifically, the manipulating bar 20 has a plurality of (more specifically, two) fixtures 22A and 22B spaced from each other in the leftward and rightward directions. The number of fixtures may be one or three or more. The fixtures 22A and 22B are fixed to the front wall 5A by screws 11, for example. As shown in FIG. 3, the fixtures 22A and 22B have positioning holes 22c defined therein, and pins 5f (see FIG. 2B) on the front wall 5A are inserted in the positioning holes 22c.

As shown in FIGS. 2A and 5A, the electronic device 1 has an outer frame 12 mounted on the outside of the main body frame 5. The outer frame 12 has a front frame member 12a disposed forwardly of the front wall 5A of the main body frame 5. The manipulating bar 20 is disposed below or downwardly of the front frame member 12a, and has a front surface 20c (see FIG. 5B) exposed forwardly. The light guide bar 30 is disposed behind the front frame member 12a.

As shown in FIG. 3, the pressable portions 21A and 21B are spaced from the fixtures 22A and 22B in the leftward and rightward directions. Specifically, the pressable portions 21A and 21B are spaced from the fixtures 22A and 22B, respectively, in the directions toward the ends of the manipulating bar 20. The pressable portion 21A, also referred to as "first pressable portion 21A," is spaced from the fixtures 22A and 22B in the leftward direction, whereas the pressable portion 21B, also referred to as "second pressable portion 21B," is spaced from the fixtures 22A and 22B in the rightward direction. The ends of the manipulating bar 20, i.e., the left and right ends of the manipulating bar 20, are free ends. Therefore, the manipulating bar 20 is elastically deformable such that the pressable portions 21A and 21B are movable in the forward and rearward directions. As described above, the switches 3 are disposed behind the pressable portions 21A and 21B. When the user presses the pressable portions 21A and 21B, the pressable portions 21A and 21B are moved rearwardly, actuating the switches 3. When the user releases the pressable portions 21A and 21B, the pressable portions 21A and 21B return to their initial positions under the resilient force of the manipulating bar 20.

As shown in FIGS. 3 and 4A, the manipulating bar 20 has protrusions 21c projecting rearwardly from the respective pressable portions 21A and 21B. When the pressable portions 21A and 21B are pressed, the rear ends of the protrusions 21c press the switches 3. As described later, the manipulating bar 20 has reflecting surfaces 20b and 20e on its lower side. In the illustrated electronic device 1, the pressable portions 21A and 21B also have reflecting surfaces 20b and 20e. Cavities are defined between the protrusions 21c and the reflecting surfaces 20b and 20e.

The positional relationship between the pressable portions 21A and 21B and the fixtures 22A and 22B is not limited to the positional relationship in the illustrated electronic device 1. For example, if the two fixtures 22A and 22B are sufficiently spaced from each other, then the portion of the manipulating bar 20 which lies between the fixtures 22A and 22B is movable in the forward and rearward directions. Therefore, the pressable portions 21A and 21B may be provided between the two adjacent fixtures 22A and 22B.

As shown in FIG. 3, the manipulating bar 20 has a plurality of guide teeth 25 projecting rearwardly and arrayed in the leftward and rightward directions. The electronic device 1 has guide cavities 5d (see FIG. 2A) at positions aligned with the guide teeth 25. The guide teeth 25 are fitted in the guide cavities 5d for guiding the manipulating bar 20 when it is elastically deformed in the forward and rearward directions. The protrusions 21c that project rearwardly from the respective pressable portions 21A and 21B are positioned between two adjacent pairs of the guide teeth 25. In the illustrated electronic device 1, the guide cavities 5d are defined in the front wall 5A of the main body frame 5.

As shown in FIG. 2B, the electronic device 1 has a plurality of light sources 19 and the light guide bar 30 for receiving light from the light sources 19, the light guide bar 30 being in the form of a bar extending in the leftward and rightward directions. The light sources 19 may include LEDs. In the illustrated electronic device 1, the light sources 19 are mounted on a circuit board 18. The light sources 19 may be controlled so that their emission colors vary with time or depending on the manner in which the electronic device 1 operates. In the illustrated electronic device 1, the light sources 19 are disposed at an end of the light guide bar 30. The light guide bar 30 is made of a light-transmissive material. Specifically, the light guide bar 30 is made of a transparent material, e.g., a synthetic resin such as acrylic resin. Unlike the manipulating bar 20, the light guide bar 30 does not contain a light diffusing agent for diffusing light. The light from the light sources 19 enters the light guide bar 30, and is reflected by the surface of the light guide bar 30 and travels in the light guide bar 30 in the leftward and rightward directions, or passes through the surface of the light guide bar 30.

As shown in FIG. 5B, the light guide bar 30 is disposed along the manipulating bar 20. In the illustrated electronic device 1, the light guide bar 30 is disposed above the manipulating bar 20, and extends along an upper surface 20a of the manipulating bar 20. The light that passes through the surface of the light guide bar 30 toward the manipulating bar 20 enters the manipulating bar 20. In FIG. 5B, some paths along which the light travels are indicated by the slid lines L1 and L2. As described above, the manipulating bar 20 is made of a light-transmissive material and contains a material for diffusing light. Therefore, when the manipulating bar 20 receives light from the light guide bar 30, the manipulating bar 20 is caused to glow by the received light. The manipulating bar 20 is separate from the light guide bar 30, and is elastically deformable in the forward and rearward directions independently of the light guide bar 30. In other words, the pressable portions 21A and 21B of the manipulating bar 20 can move in the forward and rearward directions without causing the light guide bar 30 to move. Consequently, the light guide bar 30 can be structurally optimized for making the manipulating bar 20 glow over a wide zone thereof, and the manipulating bar 20 can also be structurally optimized for producing appropriate reaction forces when the pressable portions 21A and 21B of the manipulating bar 20 are pressed.

In the illustrated electronic device 1, as described above, the pressable portions 21A and 21B are movable in the forward and rearward directions, and the light guide bar 30 is disposed above the manipulating bar 20. With this arrangement, when the pressable portions 21A and 21B are pressed, the manipulating bar 20 and the light guide bar 30 are kept out of physical interference with each other, and the distance between the manipulating bar 20 and the light guide bar 30 remains unchanged. The positional relationship between the light guide bar 30 and the manipulating bar 20 is not limited to the positional relationship in the illustrated electronic device 1. Insofar as the pressable portions 21A and 21B are movable in the forward and rearward directions as in the illustrated electronic device 1, the light guide bar 30 may be positioned below the manipulating bar 20. The light guide bar 30 may not necessarily be positioned immediately above the manipulating bar 20, but may be positioned obliquely upwardly and rearwardly of the manipulating bar 20.

As shown in FIG. 5B, the light guide bar 30 has a lower surface 30a facing the manipulating bar 20. In the illustrated electronic device 1, as described above, the light guide bar 30 is disposed above the manipulating bar 20. The lower surface 30a of the light guide bar 30 faces the upper surface 20a of the manipulating bar 20. Light that has passed through the lower surface 30a of the light guide bar 30 enters the manipulating bar 20 through its upper surface 20a, causing the manipulating bar 20 to glow. In the illustrated electronic device 1, the light guide bar 30 is of a rectangular cross-sectional shape, and has a front surface 30b, an upper surface 30c, and a rear surface 30d, in addition to the lower surface 30a.

The lower surface 30a of the light guide bar 30 may be finished by a surface treatment process, which is not performed on the other surfaces of the light guide bar 30, i.e., the front surface 30b, the upper surface 30c, and the rear surface 30d, for directing light traveling in the light guide bar 30 toward the manipulating bar 20. One example of such a surface treatment process is a surface texturing process for forming minute concavities and convexities on a surface. The surface texturing process may be performed to different degrees at different positions in the leftward and rightward directions for thereby changing the illuminance of the manipulating bar 20 at the different positions thereon. For example, the surface texturing process may be carried out on the lower surface 30a of the light guide bar 30 such that the greater the distance from the light sources 19 is, the smaller the illuminance of the manipulating bar 20 gradually becomes. The other surfaces of the light guide bar 30, i.e., the front surface 30b, the upper surface 30c, and the rear surface 30d, which do not face the manipulating bar 20 may be finished by a process for making those surfaces able to reflect light. For example, the light guide bar 30 may be formed by a mold having mirror-finished inner surfaces that produce those surfaces of the light guide bar 30. Another example of such a process may be a process for forming reflective films of metal such as tin or aluminum on those surfaces of the light guide bar 30.

The cross-sectional shape of the light guide bar 30 may be progressively smaller as the distance from the light sources 19 becomes greater. In the illustrated electronic device 1, as shown in FIG. 2A, the vertical width of the light guide bar 30 is progressively smaller in a direction away from the light sources 19. The shape of the light guide bar 30 is not limited to the shape in the illustrated electronic device 1. The cross-sectional shape of the light guide bar 30 may be a polygonal shape, e.g., an octagonal shape, having more corners than a quadrangle. According to such a modification, the light guide bar 30 should preferably have two surfaces that lie parallel to each other. The cross-sectional shape of the light guide bar 30 may include an arcuately curved surface.

As described above, the electronic device 1 has the outer frame 12, and the outer frame 12 has the front frame member 12a disposed forwardly of the front wall 5A of the main body frame 5. As shown in FIG. 5A, the front frame member 12a includes an upper wall 12b and a front wall 12c extending downwardly from the front edge of the upper wall 12b. The upper wall 12b has a rear edge extending rearwardly to the front wall 5A of the main body frame 5. The light guide bar 30 is disposed behind the front wall 12c and positioned below the upper wall 12b. Therefore, even if light leaks from the other surfaces of the light guide bar 30 than the lower surface 30a, i.e., the front surface 30b, the upper surface 30c, and the rear surface 30d, the light is prevented by the front frame member 12a from being perceived by the user. The light guide bar 30 is mounted on the front wall 12c of the front frame member 12a, for example.

As shown in FIGS. 4B and 5B, a gap or air layer is provided between the light guide bar 30 and the front frame member 12a. In the illustrated electronic device 1, the gap or air layer is provided between the front surface 30b of the light guide bar 30 and the front wall 12c of the front frame member 12a. With this arrangement, light traveling in the light guide bar 30 is reflected by the front surface 30b of the light guide bar 30 due to the difference between the refractive index of the light guide bar 30 and the refractive index of air. As a result, the front surface 30b of the light guide bar 30 is more efficiently able to reflect light than if the light guide bar 30 and the front frame member 12a are held in contact with each other, making it possible for the light guide bar 30 to send light to a position more distant from the light sources 19. There is also provided a gap between the light guide bar 30 and the front wall 5A of the main body frame 5.

One of the ends, i.e., the right end, of the light guide bar 30 is attached to the front frame member 12a. In the illustrated electronic device 1, as shown in FIG. 2A, an adhesive sheet 32 of paper is provided on the front surface of the right end of the light guide bar 30. The right end of the light guide bar 30 is bonded to the front wall 12c of the front frame member 12a by the adhesive sheet 32 of paper. An adhesive may instead be used in place of the adhesive sheet 32 of paper. The front wall 12c of the front frame member 12a may have ribs held in contact with the front surface 30b of the light guide bar 30, so that the light guide bar 30 may be positioned with respect to the front frame member 12a by the ribs.

As shown in FIG. 5B, a gap E or air layer is provided between the lower surface 30a of the light guide bar 30 and the upper surface 20a of the manipulating bar 20. There are no other members present between the lower surface 30a of the light guide bar 30 and the upper surface 20a of the manipulating bar 20. The refractive index of air and the refractive index of the light guide bar 30 are different from each other. Therefore, with this arrangement of the electronic device 1, light traveling in the light guide bar 30 is reflected by the lower surface 30a thereof, so that the light guide bar 30 can send light to a position more distant from the light sources 19. As a consequence, the manipulating bar 20 is able to glow over a wide zone thereof. The surface treatment process, i.e., the surface texturing process in the illustrated embodiment, performed on the lower surface 30a of the light guide bar 30 is effective to control the amount of light directed from the light guide bar 30 to the manipulating bar 20 at various positions along the leftward and rightward directions. The distance between the lower surface 30a of the light guide bar 30 and the upper surface 20a of the manipulating bar 20 remains the same fully along the manipulating bar 20 in the leftward and rightward directions, for example. Alternatively, the distance between the lower surface 30a of the light guide bar 30 and the upper surface 20a of the manipulating bar 20 may be progressively smaller or larger toward the end of the manipulating bar 20 remote from the light sources 19.

The manipulating bar 20 has a surface facing the light guide bar 30. Since the light guide bar 30 is disposed above the manipulating bar 20, as described above, the upper surface 20a of the manipulating bar 20 faces the light guide bar 30. Light from the light guide bar 30 enters the upper surface 20a of the manipulating bar 20. As shown in FIG. 5B, the width of the upper surface 20a of the manipulating bar 20 in the forward and rearward directions is larger than the width of the lower surface 30a of the light guide bar 30 in the forward and rearward directions. As described above, the manipulating bar 20 has the light-transmissive member 24 and the light-blocking member 23. The upper surface 20a of the manipulating bar 20 includes an area provided by the light-transmissive member 24 and an area provided by the light-blocking member 23. The width of the area provided by the light-transmissive member 24 in the forward and rearward directions is larger than the width of the lower surface 30a of the light guide bar 30 in the forward and rearward directions. In other words, a front edge 24a of the area provided by the light-transmissive member 24 is positioned forwardly of a front edge 30f of the lower surface 30a of the light guide bar 30, and a rear edge 24g of the area provided by the light-transmissive member 24 is positioned rearwardly of a rear edge 30g of the lower surface 30a of the light guide bar 30. This dimensional relationship between the lower surface 30a of the light guide bar 30 and the area provided by the light-transmissive member 24 is effective to reduce a loss of light emitted from the lower surface 30a of the light guide bar 30.

As shown in FIG. 5B, the light-transmissive member 24 has a ridge 24h positioned behind the upper surface 20a and projecting upwardly. The ridge 24h extends along the rear edge 30g of the lower surface 30a of the light guide bar 30 in the leftward and rightward directions. Light that is emitted obliquely rearwardly and downwardly from the lower surface 30a of the light guide bar 30 is received by the ridge 24h of the manipulating bar 20.

As shown in FIG. 5B, the manipulating bar 20 has the reflecting surfaces 20b and 20e for reflecting light received from the light guide bar 30 in the forward direction, so that the manipulating bar 20 can emit light forwardly from the front surface 20c. The reflecting surfaces 20b and 20e are positioned below the upper surface 20a of the manipulating bar 20. The reflecting surfaces 20b and 20e are inclined to reflect light from the upper surface 20a in the forward direction. Specifically, the reflecting surfaces 20b and 20e extend obliquely downwardly and forwardly in the cross section of the manipulating bar 20. The reflecting surfaces 20b and 20e may be finished by a surface treatment process for making those surfaces able to reflect light. For example, the manipulating bar 20 may be formed by a mold having mirror-finished inner surfaces that produce those surfaces of the manipulating bar 20. With this arrangement, light traveling in the manipulating bar 20 is reflected by the reflecting surfaces 20b and 20e due to the difference between the refractive index of the manipulating bar 20 and the refractive index of air. Another example of such a surface treatment process may be a process for forming reflective films of metal such as tin or aluminum on the reflecting surfaces 20b and 20e. In the illustrated electronic device 1, the manipulating bar 20 has the two reflecting surfaces 20b and 20e that lie at mutually different angles. The reflecting surfaces 20b and 20e are capable of orienting light received from the light guide bar 30 more effectively toward the front surface 20c of the manipulating bar 20.

As described above, in the illustrated electronic device 1, the manipulating bar 20 has the light-transmissive member 24 and the light-blocking member 23. As shown in FIG. 5B, the front surface 20c of the manipulating bar 20 includes an area A1 provided by the light-transmissive member 24 and an area A2 provided by the light-blocking member 23. With this arrangement, as the vertical width of the light-emitting area, i.e., the area A1, can be limited while the vertical width of the front surface 20c of the manipulating bar 20 can be maintained, the manipulating bar 20 allows the user to operate the pressable portions 21A and 21B with ease. In the illustrated electronic device 1, a space is provided below the manipulating bar 20. Specifically, a space larger than the vertical width of the front surface 20c of the manipulating bar 20 is provided below the manipulating bar 20. This space also allows the user to operate the pressable portions 21A and 21B with ease.

In the illustrated electronic device 1, as shown in FIG. 5B, the light-blocking member 23 extends rearwardly from the area A2 of the front surface 20c. The light-blocking member 23 surrounds a lower edge of the front frame member 12a of the outer frame 12, or more specifically, a lower edge of the front wall 12c. The light-blocking member 23 includes a portion 23a positioned below the lower edge of the front frame member 12a and a portion 23b positioned behind the lower edge of the front frame member 12a. The light-blocking member 23 prevents light from leaking out of the gap between the lower edge of the front frame member 12a and the manipulating bar 20.

As described above, the manipulating bar 20 is elastically deformable such that the pressable portions 21A and 21B are moved in the forward and rearward directions. When the manipulating bar 20 is in its initial position, i.e., is not elastically deformed, the upper surface 20a of the manipulating bar 20 has a front edge 20d positioned forwardly of the front edge 30f of the lower surface 30a of the light guide bar 30. In FIG. 4B, the pressable portion 21A pressed by the user, i.e., the pressable portion 21A where the rear end of the protrusion 21c presses the corresponding switch 3, is indicated by the solid lines. When the pressable portion 21A is pressing the switch 3 with the protrusion 21c, as shown in FIG. 4B, the front edge 20d of the upper surface 20a of the manipulating bar 20 is positioned forwardly of the front edge 30f of the lower surface 30a of the light guide bar 30. With this arrangement, when the pressable portion 21A is pressing the switch 3 with the protrusion 21c, light emitted from the lower surface 30a of the light guide bar 30 is prevented from passing between the front edge 20d of the upper surface 20a of the manipulating bar 20 and the front frame member 12a of the outer frame 12 and making the manipulating bar 20 glow at a position different from the area A1 of the front surface 20c of the manipulating bar 20.

In the illustrated electronic device 1, the front edge 20d of the upper surface 20a of the manipulating bar 20 is provided by the light-blocking member 23. When the manipulating bar 20 is in its initial position, i.e., is not elastically deformed, the light-transmissive member 24 on the upper surface 20a of the manipulating bar 20 has a front edge 24a positioned forwardly of the front edge 30f of the lower surface 30a of the light guide bar 30. As shown in FIG. 4B, when the pressable portion 21A is pressing the switch 3, the front edge 24a of the light-transmissive member 24 on the upper surface 20a of the manipulating bar 20 is positioned rearwardly of the front edge 30f of the lower surface 30a of the light guide bar 30, and the front edge 20d provided by the light-blocking member 23 is positioned forwardly of the front edge 30f of the lower surface 30a of the light guide bar 30. Rather than this dimensional relationship in the illustrated electronic device 1, the front edge 24a of the light-transmissive member 24 on the upper surface 20a of the manipulating bar 20 may be positioned forwardly of the front edge 30f of the lower surface 30a of the light guide bar 30 both when the pressable portion 21A is in its initial position and when it is pressing the switch 3.

As described above, the light sources 19 are disposed at one of the ends of the light guide bar 30. In the illustrated electronic device 1, the end of the light guide bar 30, i.e., the left end of the light guide bar 30, has a curved portion 31 curved rearwardly. The curved portion 31 extends rearwardly beyond the end of the manipulating bar 20, i.e., the left end of the manipulating bar 20. The light sources 19 are positioned behind the rear end of the curved portion 31. Light emitted from the light sources 19 enters the light guide bar 30 from the rear end of the curved portion 31. Since the curved portion 31 is curved, the light that has entered the light guide bar 30 from the rear end of the curved portion 31 is reflected by the curved portion 31 and travels in the light guide bar 30. Therefore, the light traveling in the light guide bar 30 is reflected an increased number of times, resulting in an increased amount of light transmitted from the light guide bar 30 to the manipulating bar 20.

The curved portion 31 of the light guide bar 30 is disposed on a side of the electronic device 1. In the illustrated electronic device 1, as shown in FIG. 2A, the main body frame 5 has a side wall 5B extending rearwardly from the end of the front wall 5A. The curved portion 31 is disposed on the outside of the side wall 5B, or specifically, on the left side of the side wall 5B. The light sources 19 are mounted on the circuit board 18 which is attached to the side wall 5B of the main body frame 5. With this arrangement of the electronic device 1, it is not necessary to provide a space for accommodating the circuit board 18 on the front side of the electronic device 1. Consequently, the layout of the circuit boards 3A and 3B with the switches 3 mounted thereon can be designed with a higher degree of freedom. Furthermore, as described above, the manipulating bar 20 of the electronic device 1 is elastically deformable independently of the light guide bar 30. Consequently, when the pressable portions 21A and 21B of the manipulating bar 20 are pressed, the distance between the rear end of the curved portion 31 of the light guide bar 30 and the light sources 19 remains unchanged.

As described above, the electronic device 1 has the manipulating bar 20 extending in the leftward and rightward directions and the light guide bar 30 extending in the leftward and rightward directions and disposed along the manipulating bar 20, the light guide bar 30 being separate from the manipulating bar 20. The manipulating bar 20 has portions serving as the pressable portions 21A and 21B that can be pressed by the user, and is elastically deformable such that the pressable portions 21A and 21B are movable in the forward and rearward directions. The light guide bar 30 receives light from the light sources 19. The manipulating bar 20 is made of a light-transmissive material, and is caused to glow by the light received from the light guide bar 30. With this arrangement, the light guide bar 30 can be structurally optimized for making the manipulating bar 20 glow over a wide zone thereof. The manipulating bar 20 can also be structurally optimized for producing appropriate reaction forces when the pressable portions 21A and 21B thereof are pressed.

The principles of the present disclosure are not limited to the illustrated electronic device 1, but are also applicable to many changes and modifications which may be made in the embodiment described above.

For example, the manipulating bar 20 may not necessarily extend straight, but may be curved in the upward and downward directions, and the light guide bar 30 may be curved in conformity with the manipulating bar 20 thus curved.

The light guide bar 30 may not necessarily be positioned immediately above the manipulating bar 20, but may be positioned obliquely upwardly and rearwardly of the manipulating bar 20.

The present disclosure contains subject matter related to that disclosed in Japanese Priority Patent Application JP 2016-152224 filed in the Japan Patent Office on Aug. 2, 2016, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:

1. An electronic device comprising:
   a manipulating member extending in first directions and having a portion serving as a pressable portion which is pressed by a user, the manipulating member being elastically deformable such that the pressable portion is movable in second directions transverse to the first directions;
   a light source; and
   a light guide member configured to receive light from the light source, the light guide member extending in the first directions and being disposed along the manipulating member, the light guide member being separate from the manipulating member,
   wherein the manipulating member is made of a light-transmissive material and is caused to glow by the light received from the light guide member,
   wherein the light guide member is positioned with respect to the manipulating member in one of third directions that are transverse to the first directions and the second directions,
   wherein the manipulating member is elastically deformable such that the pressable portion is movable between a first position serving as an initial position and a second position defined with respect to the first position in one of the second directions,
   wherein the light guide member has a first surface facing in another one of the third directions and facing the manipulating member,
   wherein the manipulating member has a second surface facing in the one of the third directions and facing the light guide member, and
   wherein the one of the second directions is defined as being rearward, another one of the second directions as being forward, and the second surface of the manipulating member has a front edge positioned forwardly of a front edge of the first surface of the light guide member when the pressable member is in the second position.

2. The electronic device according to claim 1, wherein the manipulating member has a reflecting surface reflecting the light received from the light guide member in one of the second directions.

3. The electronic device according to claim 1, wherein the pressable portion of the manipulating member includes a first pressable portion and a second pressable portion spaced from the first pressable portion in the first directions;
   the light guide member has a portion extending in the first directions beyond the position of the first pressable portion and the position of the second pressable portion; and
   the light from the light source enters the portion of the light guide member.

4. An electronic device comprising:
   a manipulating member extending in first directions and having a portion serving as a pressable portion which is pressed by a user, the manipulating member being elastically deformable such that the pressable portion is movable in second directions transverse to the first directions;
   a light source; and
   a light guide member configured to receive light from the light source, the light guide member extending in the first directions and being disposed along the manipulating member, the light guide member being separate from the manipulating member,
   wherein the manipulating member is made of a light-transmissive material and is caused to glow by the light received from the light guide member
   wherein the light guide member is positioned with respect to the manipulating member in one of third directions that are transverse to the first directions and the second directions, and
   wherein the electronic device further comprises an outer wall disposed along the light guide member and covering the light guide member for preventing the light guide member from being exposed in one of the second directions, wherein the manipulating member is positioned in another one of the third directions beyond the outer wall, and is exposed in the one of the second directions.

5. An electronic device comprising:
   a manipulating member extending in first directions and having a portion serving as a pressable portion which is pressed by a user, the manipulating member being elastically deformable such that the pressable portion is movable in second directions transverse to the first directions;
   a light source; and
   a light guide member configured to receive light from the light source, the light guide member extending in the first directions and being disposed along the manipulating member, the light guide member being separate from the manipulating member,
   wherein the manipulating member is made of a light-transmissive material and is caused to glow by the light received from the light guide member,
   wherein an air layer is provided between the light guide member and the manipulating member, and
   wherein the light guide member has a first surface facing the manipulating member and a third surface facing away from the manipulating member; and the first surface is finished by a different process from a process for finishing the third surface.

* * * * *